United States Patent Office 3,046,287
Patented July 24, 1962

3,046,287
ALIPHATIC MOLYBDENUM CARBOXYLATE CHLORIDES AND METHOD FOR MAKING SAME
Melvin Leo Larson, Royal Oak, Mich., assignor to American Metal Climax, Inc., New York, N.Y., a corporation of New York
No Drawing. Filed Apr. 2, 1959, Ser. No. 803,571
10 Claims. (Cl. 260—429)

This invention relates to organometallic compounds and more particularly to the molybdenum carboxylate compounds which are obtained from reacting molybdenum pentachloride with certain aliphatic monocarboxylic acids. The invention additionally concerns the method of using such compounds to catalyze the polymerization of ethylenically unsaturated monomers.

The primary object of this invention is to provide a novel family of useful molybdenum carboxylate chloride compounds.

Another important object is to provide a practicable method for synthesizing and isolating molybdenum carboxylate chloride compounds.

A further object is to provide an organomolybdenum catalyst for use in the polymerization of ethylenically unsaturated hydrocarbons.

The compounds which are encompassed by this invention are the molybdenum carboxylate chlorides having the following formula:

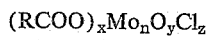

$(RCOO)_x Mo_n O_y Cl_z$ in which R is a radical selected from the group consisting of aliphatic radicals having 1–17, inclusive, carbon atoms and aliphatic radicals having 1–17, inclusive, carbon atoms alpha-substituted with halogen radicals, x is 1 to 3, n is 1 to 3, y is zero to 3, and z is 1 to 4. The easiest to prepare and most useful compounds within the above general formula are those compounds included therein when x is 2, y is zero, n is 1, and z is three, that is, the molybdenum trichloride dicarboxylates having the formula:

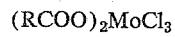

$(RCOO)_2 MoCl_3$ in which R is a radical selected from the group consisting of aliphatic radicals having 1–17, inclusive, carbon atoms and alpha-halogen-substituted aliphatic radicals having 1–17, inclusive, carbon atoms.

In accordance with this invention, it has been found that molybdenum pentachloride is specifically reactive with aliphatic monocarboxylic acids and capable of producing the above defined family of molybdenum compounds when the reaction is effected in a non-polar solvent or a solvent substantially free of active hydrogen. In such a solvent, the admixture of molybdenum pentachloride and the selected aliphatic monocarboxylic acid react, upon agitation, at temperatures from about room temperatures to about 60° C. to form a molybdenum carboxylate chloride. Under such admixture conditions, the molybdenum pentachloride and the selected acid appear to react in equimolar proportions to form the monocarboxylate ester and the dicarboxylate ester. However, when the carboxylic acid reactant is present in excess of 2 mols of carboxylic acid to 1 mol of molybdenum pentachloride, the dicarboxylate ester is formed. It has been found that while two of the chlorine atoms of molybdenum pentachloride are relatively easily replaced with a carboxylate radical the remaining three chlorine atoms are much more difficult to displace. Even though more difficult and, as the above general formula indicates, two of the remaining three chlorine atoms of molybdenum pentachloride can be replaced with oxygen or additional carboxylate groups to form condensed or partially polymerized molybdenum polycarboxylate oxychlorides, and such compounds result from continued reaction at a slightly higher temperature than was employed in the initial esterification reaction. Although insufficient evidence has been obtained to conclusively explain the complete reaction mechanism, apparently the reaction comprises two stages, and when the reaction product is insoluble in the reaction solvent the product of these separate stages is visible. It is believed that the first stage of the reaction involves the formation of a molybdenum coordination product and the second stage involves the conversion of this coordination product with concurrent replacement of chloride into the compounds of this invention. This two stage mechanism is evidenced by a difference in color of the initial reaction product relative to the final compound and, in general, the initial reaction product has a bright green color while the final compound is less bright and has more of a light green hue.

All of the compounds of this invention are green solids which are susceptible to dehydrochlorination above about 75° C. It is therefore desirable to avoid the use of such temperatures during reaction and no advantage has been found in employing temperatures exceeding about 60° C. This rate of reaction decreases as the number of carbon atoms in the carboxylic acid increases and the use of temperatures in the range of about 40° C. to about 50° C. and preferably about 50° C., produces good yield in a relatively short reaction time. To illustrate this relationship and to provide a guide for the selection of optimum conditions for the particular carboxylic acid being employed it was found that acetic anhydride and molybdenum pentachloride in carbon tetrachloride at room temperature, about 25° C., reacted substantially immediately to form light green crystals and by merely continuing to agitate the reactants a commercial yield of molybdenum trichloride diacetate was obtained. However upon reacting stearic acid and molybdenum pentachloride in carbon tetrachloride, it was found to be necessary to raise the temperature of the reacting mass from about 25° C. to about 40° C. and maintain the 40° C. temperature for about an hour or more before the compound molybdenum trichloride distearate was formed. In general, therefore, as the carbon chain length of the carboxylic acid increases, it is desirable to increase the reacting temperature from room temperature to within the 40° C.–60° C. range.

The compounds of this invention may be prepared from any of the aliphatic monocarboxylic acids, or the corresponding anhydrides, having 1–17, inclusive, carbon atoms, or the alpha halogen substituted aliphatic carboxylic acids having 1–17, inclusive, carbon atoms. While saturated alkyl monocarboxylic acids represent the preferred acid reactant, the double-bond unsaturated acids having 1–17, inclusive, carbon atoms and alicyclic carboxylic acids known generally as the naphthenic acids, particularly cyclopentane and cyclohexane carboxylic acids may also be employed and specifically including, for example, acetic, propionic, butyric, caprylic, lauric, palmitic, stearic, acrylic, methacrylic, cinnamic, cyclopentylacetic, 3-methylcyclopentylacetic, 2-methylcyclopentylpropionic, butenic, oleic acids, etc.

Any of the halogens can be satisfactorily present as substituents on the alpha carbon atom, but the chloro- and fluoro-substituted acids represent the preferred halogen substituted acid reactants, particularly trichloroacetic and trifluoroacetic acids.

As above stated, the solvent in which the reaction is carried out must be one which is non-polar or one which does not contain an active hydrogen but which is a solvent for the reactants and preferably a non-solvent or only a partial solvent for the compounds of this invention. A number of solvents satisfy these requirements including carbon tetrachloride, benzene, n-hexane, ethylene dichloride, perchloroethane, nitrobenzene, and of this group benzene, carbon tetrachloride and nitrobenzene constitute a preferred sub-group.

By continuing the reaction after the formation of the molybdenum mono- or dicarboxylate chloride, particularly at an elevated temperature approaching the reflux temperature of the solvent, the compounds undergo a condensation, pseudo-condensation or polymerization in which one or more of the chlorine atoms is replaced with oxygen and/or a carboxylate radical and this condensation product is admixed with the remaining molybdenum dicarboxylate chloride. The exact mechanism of this condensation is unknown but there is some evidence that continued reaction tends to convert the molybdenum dicarboxylate trichloride into a molybdenum mono-carboxylate oxy-dichloride, and to convert the molybdenum tricarboxylate dichloride into molybdenum dicarboxylate oxy-chloride. In any event, continued reaction for extended time periods is undesirable particularly at temperatures approaching 80° C.–85° C.

The compounds of this invention are soluble, with reaction, in polar oxygenated solvents such as water, acetone, butyl acetate, etc. Hydrolysis with water occurs readily, and especially with the shorter carbon chain compounds atmospheric moisture is sufficient to convert the green crystalline compounds into brown hydrolysis products in a short time and usually with the release of the corresponding carboxylic acid. The compounds of this invention also react with alcohols to give the corresponding ester, and undergo a condensation comparable to a Friedel-Crafts condensation to yield the corresponding ketone. The compounds have been found to be useful as catalysts in the polymerization of ethylenically unsaturated hydrocarbons, for example, styrene. They are also useful as co-catalysts in the low pressure polymerization of ethylene and propylene, such co-catalysts being the alkyl metal compounds of groups 1A, 2A, and 3A of the periodic table, and specifically including alkyl compounds of lithium, magnesium, calcium, boron and aluminum.

The examples which follow illustrate in greater detail typically suitable operating conditions, proportions of reactants and procedures for separating the compounds of this invention as well as product characteristics, but it is to be understood that they are illustrative only and do not contain the defining limits of this invention which have been given hereinabove.

*Example I*

56.2 grams of acetic anhydride was admixed with 250 ml. of carbon tetrachloride and 30.2 grams of molybdenum pentachloride was quickly added thereto with stirring, at room temperature in a dry nitrogen atmosphere. Light green crystals were immediately formed. The stirring was continued for 22 hours, at room temperature, and the green crystalline solid product was separated by filtration and vacuum dried for 2 hours at room temperature and for one-half hour at 35° C. on a water bath. The dried product weighed 120 grams, thus giving a yield of 34%. A melting point determination showed the compound melted in the range of 80° C.–85° C. with hydrogen chloride evolution. A portion of the product was analyzed and found to contain 15.01% carbon, 1.40% hydrogen, 32.05% Cl and 30.27% Mo, and this analysis corresponds to a compound having the formula $C_4H_6Cl_3MoO_4$, within the limits of normal analytical error.

The reaction mixture filtrate was refluxed and fractionally distilled for two hours and 17.6 grams of acetyl chloride was separated. Intermittent refluxing and continued distillation for a total of approximately five hours produced an additional 11.6 grams of acetyl chloride, which was separated and found to have a boiling point of 52° C.–55° C.

The above reaction was repeated by admixing 47.05 grams of molybdenum pentachloride and 21.9 grams of glacial acetic acid in 500 ml. of carbon tetrachloride by employing the conditions specified above and similar light green crystals were obtained.

Styrene monomer inhibited to resist polymerization at normal room temperature was slowly added to a container containing a portion of the molybdenum trichloride diacetate product, prepared above, until the molybdenum trichloride diacetate represented 1.25% by weight of the total reaction mixture, and the mass was agitated for 30 minutes and thereafter allowed to stand for 20 hours at 20° C.–24° C. At the end of this period the polymerization mixtures were extracted with hot toluene and precipitated with excess methanol to obtain the higher molecular weight fraction. The precipitated polymers were then separated by filtration through fritted glass, Gooch-type crucibles. The separated polymer was then vacuum dried to constant weight, first at room temperature and thereafter in an oven at 60° C. and 10 mm. of mercury pressure. The precipitated polymer was in the form of a viscous mass and represented a 36.6% yield based on the original styrene monomer weight. The softening point of the polymer was determined to be 77° C.–78° C. and the melting range was found to be 100° C–110° C.

*Example II*

50 grams of commercial stearic acid having an analysis of 93% stearic acid, 5% palmitic acid and 2% oleic acid, was added to 500 ml. of warmed carbon tetrachloride and after cooling the solution to room temperature 24.1 grams of molybdenum pentachloride was quickly added. The reaction mixture was stirred for 26 hours at room temperature and at the end of this time a dark green crystalline solid was apparent in the bottom of the reacting vessel. Vacuum filtration was used to separate the crystalline solid from the reacting medium and 5 grams of a heavy dark green material was recovered. This solid was vigorously hydrolyzed by water and dissolved in ethanol to give ethyl stearate. This heavy dark green crystalline is thought to be a molybdenum pentachloride coordination compound. The reaction mixture filtrate was then heated on a water bath for 1½ hours at 40° C. and at the end of this time was concentrated to approximately half its original volume. From this concentrate a green gelatinous solid was separated by centrifugation and found to be light green in color. The light green solid was washed with carbon tetrachloride and separated again by centrifuging. The separated solid was then dried on a water bath at 45° C. to 50° C. and the dried product represented a yield of 17%. The dried product had a melting point of 78° C.–80° C. with decomposition resulting in dehyrochlorination. A portion of the product was tested for solubility and found to be soluble in carbon tetrachloride, diethyl ether, petroleum ether and benzene and to be slightly soluble in ethanol and acetone. The product hydrolyzed in water to give a quantitative yield of stearic acid.

A portion of the product, upon analysis, was found to contain 56.54% carbon, 9.26% hydrogen, 12.72% Cl and 12.50% molybdenum. This analysis corresponds to a molecular formula $C_{36}H_{70}Cl_3MoO_4$, within the limits of an analytical error.

Styrene monomer was slowly added to a container containing a portion of the molybdenum trichloride distearate product, prepared above, at room temperature and the addition was continued until the molybdenum trichloride distearate represented 0.83% by weight of the reaction mixture. The mixture was agitated for 30 minutes and thereafter allowed to stand at a temperature of 20° C.–24° C. for 20 hours. A polymer was formed and was separated by employing the procedure set forth above in Example I and was in the form of a granular solid. The resulting polymer had a softening point of 86° C. to 87° C. and a melting range of 100° C. to 110° C.

Example III 25 ml. of ethanol was added to 1.05 grams of the molybdenum trichloride distearate, specified in Example II, and the molybdenum trichloride distearate dissolved immediately but without exothermic reaction. The reaction mixture was refluxed for 5 hours with complete solvation, the reaction mixture taking on a brown color. The reaction mixture was shaken with a large excess of water, saturated with sodium chloride, and extracted with two volumes of diethyl ether. The ether extract was dried to constant weight to obtain 0.75 gram of ethyl stearate, 93% yield. The melting point of the ethyl stearate product was determined and found to be 34° C.–35° C., and this was confirmed by a mixed melting point with authentic sample.

What is claimed is:

1. A molybdenum carboxylate chloride having the formula:

$$(RCOO)_2MoCl_3$$

in which R is radical selected from the group consisting of aliphatic radicals having 1–17, inclusive, carbon atoms and aliphatic radicals having 1–17, inclusive, carbon atoms alpha-substituted with a halide.

2. Molybdenum trichloride diacetate.

3. Molybdenum trichloride distearate.

4. The method of making a molybdenum carboxylate chloride which comprises the step of reacting molybdenum pentachloride with an acid selected from the group consisting of aliphatic monocarboxylic acids having 2 to 18 carbon atoms and aliphatic monocarboxylic acids having 2 to 18 carbon atoms substituted with a halide in a non-polar organic solvent at a temperature between about room temperature and about 60° C. and separating the product from said solvent.

5. The method of making a molybdenum carboxylate chloride which comprises the step of reacting 1 mol of molybdenum pentachloride with about 1–5 mols of an acid selected from the group consisting of aliphatic monocarboxylic acids having 2 to 18 carbon atoms and aliphatic monocarboxylic acids having 2 to 18 carbon atoms substituted with a halide in a non-polar organic solvent at a temperature between room temperature and about 60° C. and separating said product from said solvent.

6. A method in accordance with claim 5 wherein said acid is acetic acid.

7. A method in accordance with claim 5 wherein said acid is trifluroacetic acid.

8. A method in accordance with claim 5 wherein said acid is trichloroacetic acid.

9. A method in accordance with claim 5 wherein said acid is selected from the group consisting of stearic, palmitic and oleic acids and mixtures thereof.

10. A method of making a molybdenum carboxylate chloride which comprises the step of reacting 1 mol of molybdenum pentachloride with about 1–5 mols of an acid selected from the group consisting of aliphatic monocarboxylic acids having 2–18 carbon atoms substituted with a halide in a solvent selected from the group consisting of benzene, carbon tetrachloride and nitro benzene at a temperature between room temperature and about 60° C. and separating said product from said solvent.

References Cited in the file of this patent

UNITED STATES PATENTS

| | | |
|---|---|---|
| 2,132,997 | Plechner | Oct. 11, 1938 |
| 2,480,823 | Morris et al. | Sept. 6, 1949 |
| 2,599,553 | Hotten | June 10, 1952 |
| 2,728,758 | Field et al. | Dec. 27, 1955 |
| 2,791,576 | Field et al. | May 7, 1957 |

OTHER REFERENCES

Koenig: "Journal of the American Chemical Society," vol. 36, pages 951–961 (1914).

Rosenheim et al.: "Zeitschrift für anorganische und allgemeine Chemie," vol. 214, No. 2, Sept. 19, 1933, pages 209–224.